United States Patent
Aftanas

(10) Patent No.: US 7,926,685 B2
(45) Date of Patent: Apr. 19, 2011

(54) SINGLE SIDE RELEASE VEHICLE ARTICLE CARRIER SYSTEM AND METHOD

(75) Inventor: Jeffrey M Aftanas, Ortonville, MI (US)

(73) Assignee: JAC Products, Inc., Saline, MI (US)

( * ) Notice: Subject to any disclaimer, the term of this patent is extended or adjusted under 35 U.S.C. 154(b) by 987 days.

(21) Appl. No.: 11/539,986

(22) Filed: Oct. 10, 2006

(65) Prior Publication Data
US 2007/0125817 A1  Jun. 7, 2007

Related U.S. Application Data

(60) Provisional application No. 60/742,153, filed on Dec. 2, 2005.

(51) Int. Cl.
*B60R 9/048* (2006.01)

(52) U.S. Cl. ......... 224/321; 224/309; 224/315; 224/322

(58) Field of Classification Search ............... 224/309, 224/315, 320, 321, 322, 325, 326, 329; 410/104, 410/105, 143
See application file for complete search history.

(56) References Cited

U.S. PATENT DOCUMENTS

| | | | |
|---|---|---|---|
| 4,294,388 A | | 10/1981 | Wunstel |
| 5,190,198 A | | 3/1993 | Cucheran |
| 5,588,572 A | * | 12/1996 | Cronce et al. ............... 224/321 |
| 5,715,980 A | | 2/1998 | Blankenburg et al. |
| 5,778,729 A | * | 7/1998 | Tsai ................................. 74/489 |
| 5,833,103 A | | 11/1998 | Rak |
| 5,979,266 A | * | 11/1999 | Nagano ........................ 74/502.2 |
| 6,050,467 A | * | 4/2000 | Drouillard et al. ............ 224/321 |
| 6,068,169 A | | 5/2000 | Aftanas |
| 6,112,964 A | | 9/2000 | Cucheran et al. |
| 6,216,928 B1 | | 4/2001 | Blankenburg et al. |
| 6,779,696 B2 | | 8/2004 | Aftanas et al. |
| 7,044,345 B2 | | 5/2006 | Aftanas |

FOREIGN PATENT DOCUMENTS

| | | |
|---|---|---|
| DE | 10019421 | 12/2000 |
| FR | 2705295 | 11/1994 |

* cited by examiner

*Primary Examiner* — Nathan J Newhouse
*Assistant Examiner* — Steven M Landolfi, Jr.
(74) *Attorney, Agent, or Firm* — Harness, Dickey & Pierce, P.L.C.

(57) ABSTRACT

A vehicle article carrier system having at least one single side releasable cross bar. The cross bar includes end support assemblies at opposite ends thereof. Each end support assembly includes a pivotally mounted locking member which can be locked and unlocked relative to an associated side rail. Both of the locking members can be locked and unlocked by a user manually engaging one of the locking members and pivotally moving it into an unlocked position. This causes simultaneous pivoting movement of the locking member at the opposite end of the cross bar so that both the locking members are simultaneously locked and unlocked from their respective side rails. When in the unlocked position, the cross bar can be lifted directly off of the side rails, thus eliminating the need for any disassembly of the side rails when the user desires to remove the cross bar entirely from the side rails.

13 Claims, 14 Drawing Sheets

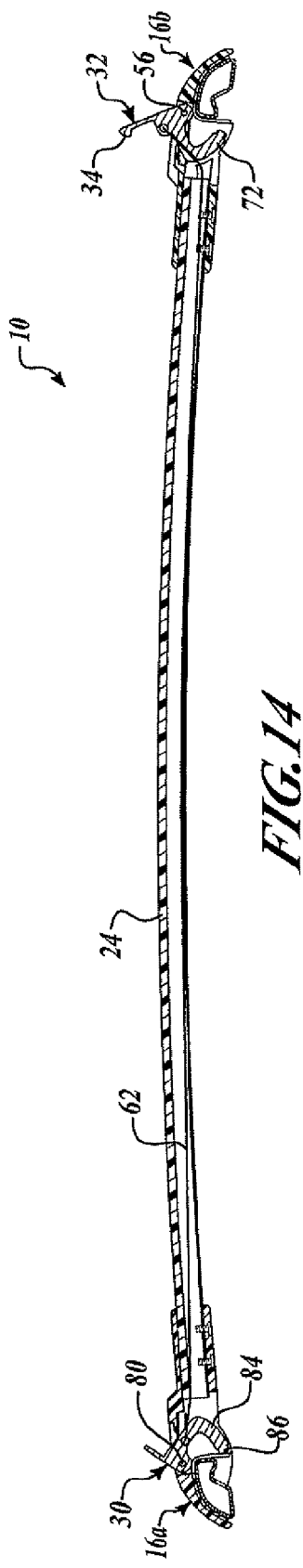
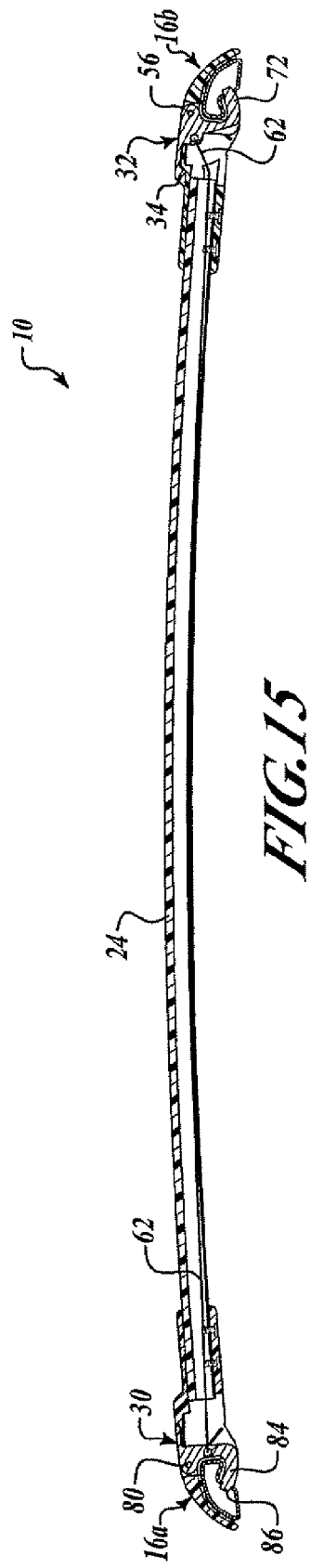

SINGLE SIDE RELEASE VEHICLE ARTICLE CARRIER SYSTEM AND METHOD

CROSS-REFERENCE TO RELATED APPLICATIONS

This application claims the benefit of U.S. Provisional Application No. 60/742,153, filed on Dec. 2, 2005. The disclosure of the above application is incorporated herein by reference.

FIELD

The present invention relates to vehicle article carrier systems, and more particularly, to a single side release vehicle article carrier system that incorporates a cross bar having a latching mechanism that allows both ends of the cross bar to be locked or unlocked from associated support rails simultaneously from one side of the cross bar.

BACKGROUND

Vehicle article carriers are used in a wide variety of applications to transport a wide variety of articles on an exterior surface of a motor vehicle, such as a car, truck, SUV, etc. Often such vehicle article carrier systems include a pair of side rails that are fixedly mounted to a roof portion of the vehicle, and a pair of cross bars that are coupled between the side rails. The cross bars are used to support articles thereon above an outer body surface of the vehicle. One or more of the cross bars may be adjustable in position along the side rails so that the spacing between the cross bars can be optimized to best suit a particular article being supported on the cross bars.

Some vehicle article carrier systems employ cross bars that have a single side release mechanism. However, these mechanisms are often complex and/or expensive to construct. A single side release mechanism allows the locking components at each end of the cross bar to be simultaneously released from engagement with both of the side rails, when an operator manually engages an actuating or unlocking element at one side of the cross bar. Thus, there is no need for the user to walk around to the opposite side of the vehicle to unlock the other end of the cross bar; both locking mechanisms at opposite ends of the cross bar are simultaneously locked and unlocked from one side of the cross bar.

While such single side release mechanisms used with cross bars in an article carrier system have proven to be effective and to have added significant convenience and ease to the operation and adjustment of the cross bars of a vehicle article carrier system, it would nevertheless be desirable to provide a vehicle article carrier system having a single side releasable cross bar that has a simple, yet robust construction. It would further be desirable to provide a single side releasable cross bar that has a minimum number of independent component parts required for implementing the single side release feature.

SUMMARY

The present disclosure is directed to a vehicle article carrier system incorporating at least one single side release cross bar. The cross bar achieves the single sided release function with a minimal number of independent component parts and provides a robust structure that is simple and convenient for an operator to use.

In one preferred form, a cross bar of the system includes an end support assembly at each end thereof. Each end support assembly includes a pivotally mounted locking member. One of the locking members also includes structure which enables an operator to easily manually grasp a portion of the locking member and to move it from a locked position to an unlocked position. The two locking members are coupled by a cable that extends within an interior area of the cross bar. The cable is coupled to each of the locking members such that movement of one of the locking members from a locked position to an unlocked position causes simultaneous movement of the locking mechanism at the opposite end of the cross bar from its locked to its unlocked position. In one preferred form, the cable is a steel cable coated with nylon.

In one preferred embodiment, each of the locking members, when moved into their unlocked positions, enable the cross bar to be lifted directly off of the support side rails. Thus, the cross bar can be easily removed from the side rails when it is not needed for use, without any disassembly of the side rails being required.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. In the drawings:

FIG. 14 is a side view of the cross bar showing both of the locking members at opposite ends of the cross bar in their unlocked positions; and FIG. 15 is a side view of the cross bar with the locking members both in their locked positions.

DETAILED DESCRIPTION

The following description is merely exemplary in nature and is not intended to limit the present disclosure, application, or uses.

Figure 1:
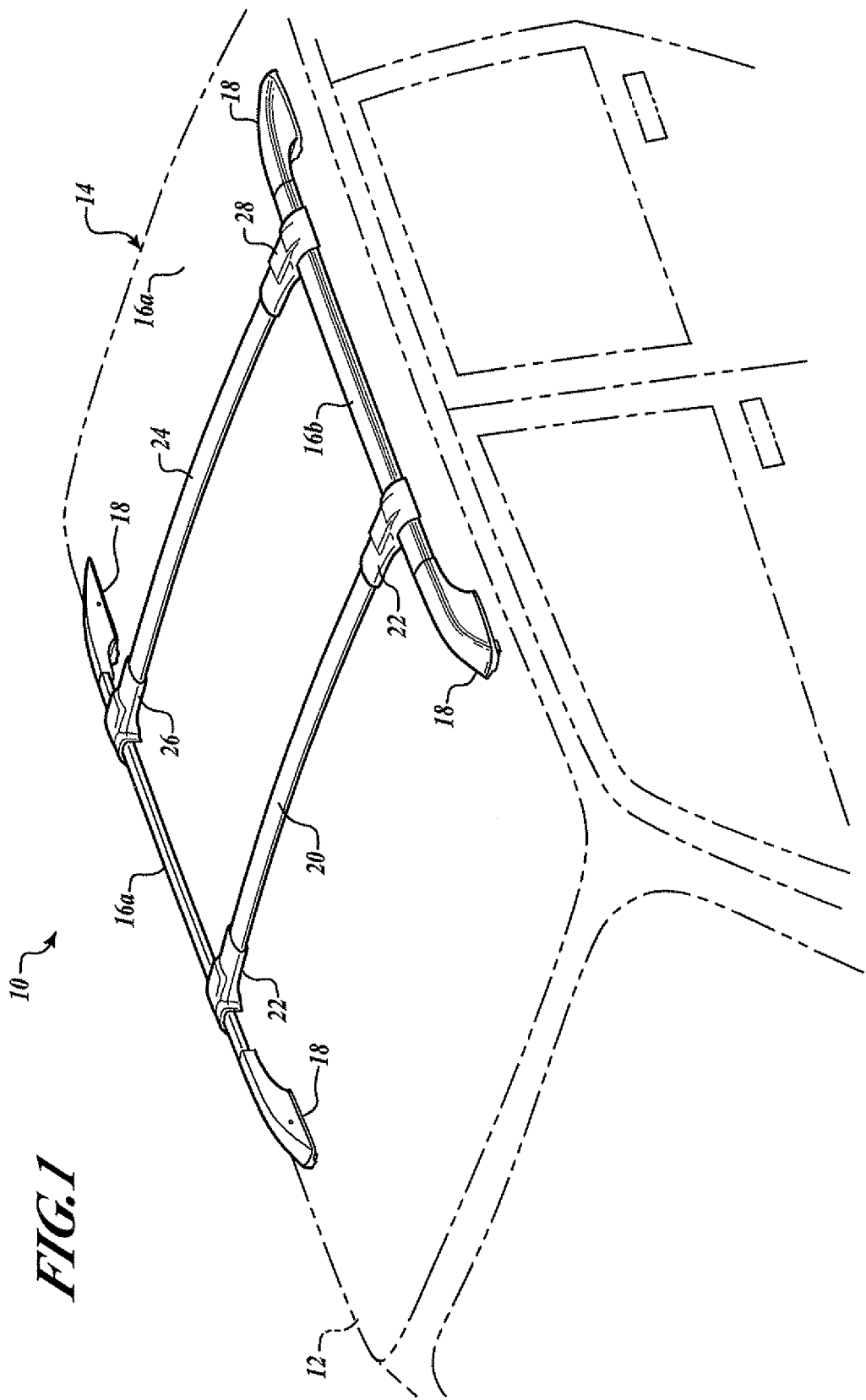
FIG. 1 is a perspective view of a motor vehicle incorporating a vehicle article carrier system in accordance with one embodiment of the present disclosure.

Referring to FIG. 1, there is shown a vehicle article carrier system 10 positioned on an exterior body surface (i.e., roof) 12 of a motor vehicle 14. The vehicle article carrier system 10 includes a pair of support rails in the form of side rails 16*a* and 16*b*. Side rails 16*a* and 16*b* are fixedly secured to the outer body surface 12 via four support feet 18, such that the side rails 16*a*, 16*b* are elevated above the outer body surface 12. In one preferred form, the system 10 includes a fixed cross bar 20 having end support assemblies 22 that can be fixed at the front or rear of system 10. The cross bar 20 is not movable along the side rails 16*a*, 16*b*. In a specific embodiment, a movable tubular cross bar 24 is included having end-support assemblies 26 and 28. End support assemblies 26 and 28 can be placed in either locked or unlocked positions. In unlocked positions, the cross bar 24 can be lifted off of the side rails 16*a* and 16*b* when the cross bar 24 is not needed for use. In their locked positions, the end support assemblies 26 and 28 secure the cross bar 24 fixedly at a desired point along the side rails 16*a*, 16*b*. In an alternative preferred embodiment, the system 10 includes two cross bars, such as two cross bars 24, each having a pair of end supports 26 and 28, that are both removable from the side rails 16*a* and 16*b*, and are both adjustably positionable along the side rails 16*a*, 16*b*.

Figure 2:
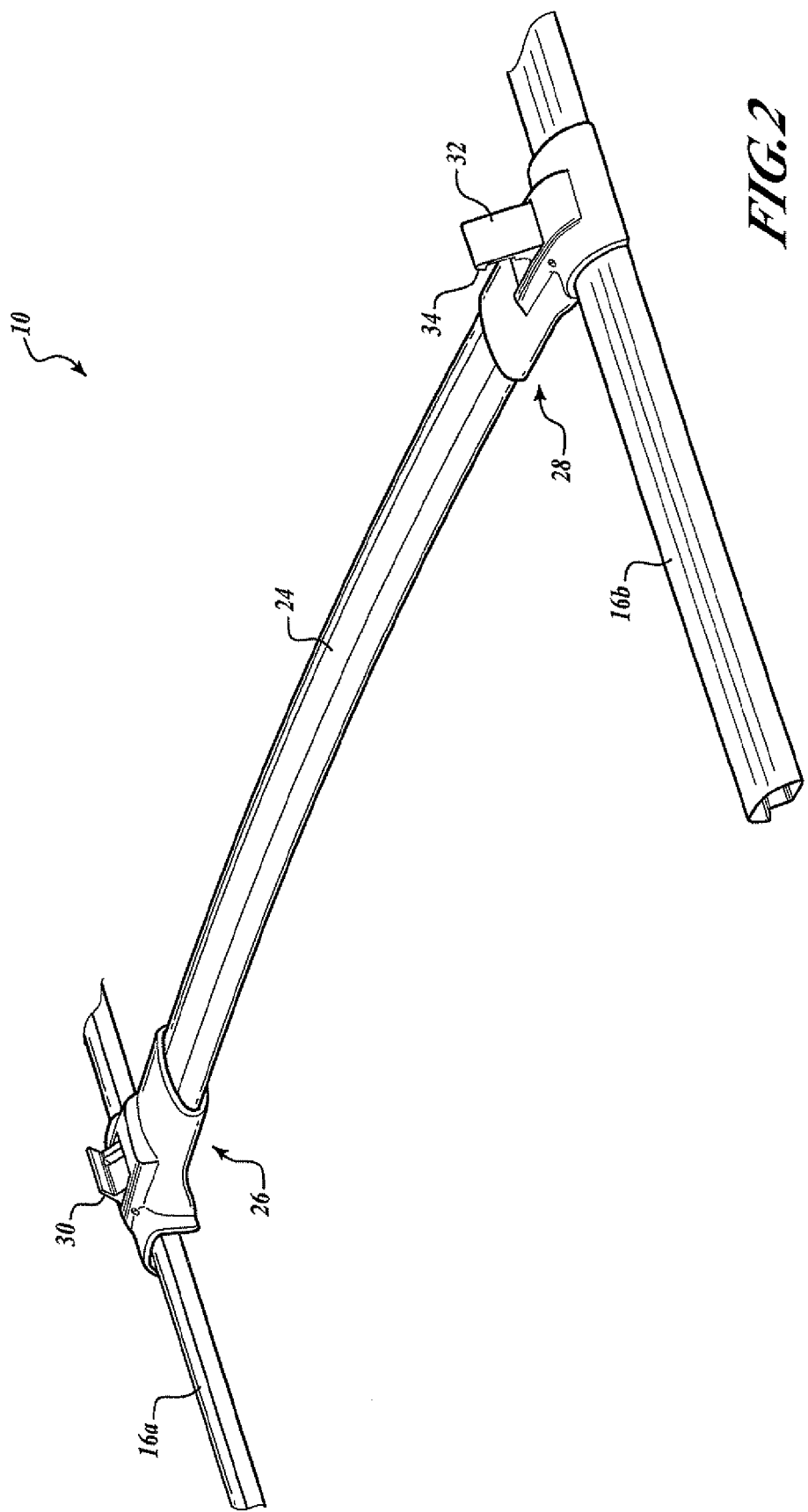
FIG. 2 is an enlarged perspective view of the article carrier system with the locking members of each end support assembly of the cross bar in their unlocked positions, ready to allow the cross bar to be lifted off of the side rails.
Figure 3:
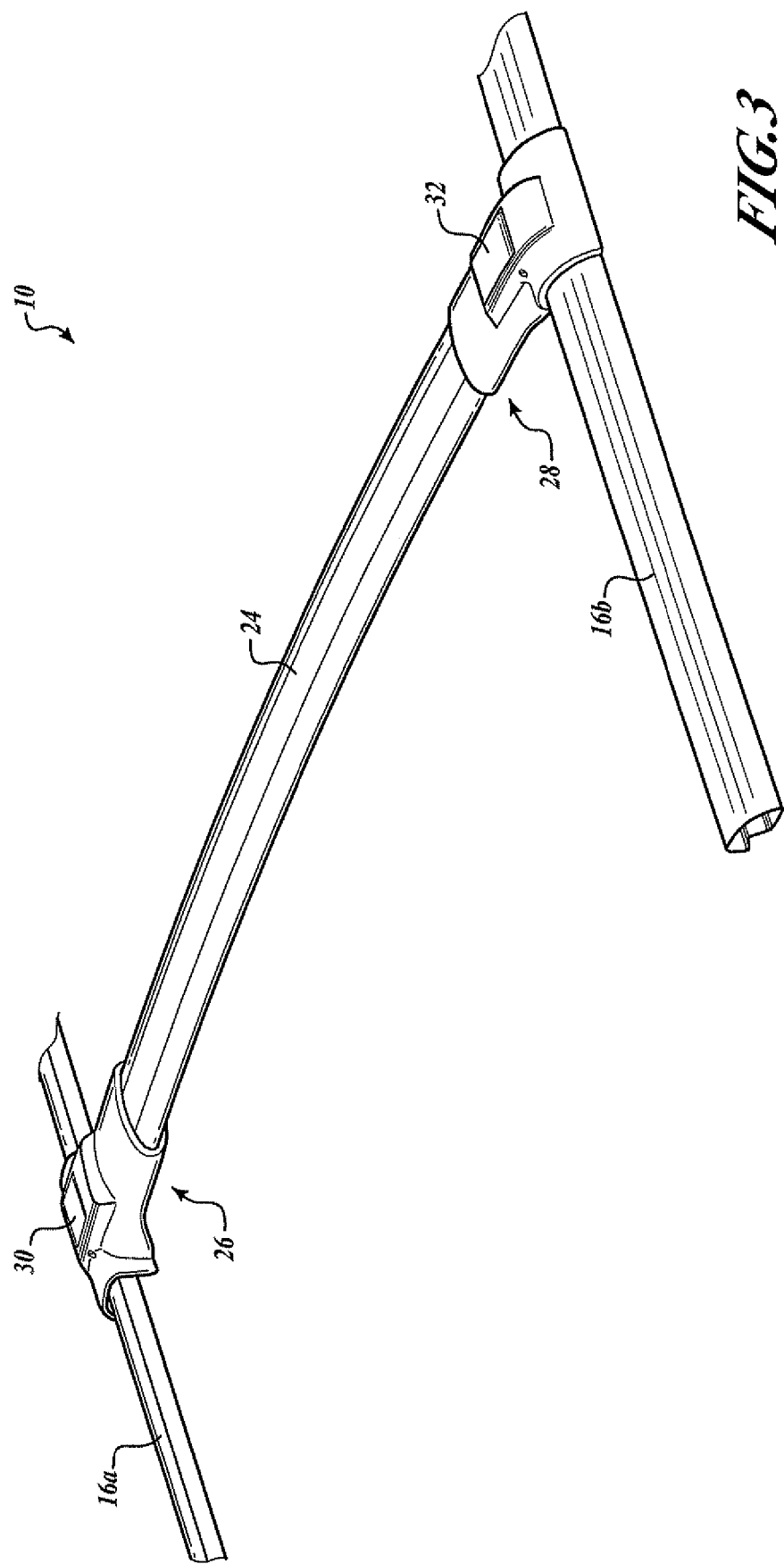
FIG. 3 is a perspective view of the vehicle article carrier system with the locking members in locked positions.

Referring to FIGS. 2 and 3, the system 10 is shown apart from the vehicle 14. In FIG. 2, the end support assemblies 26 and 28 can be seen to include locking members 30 and 32, respectively. Locking member 32 can be seen to include a lip 34 which enables it to be easily manually grasped by an individual and lifted into the position shown in FIG. 2. The locking member 30 does not include any such lip. FIG. 3 illustrates the locking members 30, 32 in their locked positions. With the locking members 30, 32 in their positions shown in FIG. 2, the cross bar 24 can be moved slidably along the side rails 16*a*, 16*b*, or it can be lifted vertically off of the side rails 16*a* and 16*b* if needed. With the locking members 30 and 32 in the position shown in FIG. 3, the cross bar 24 is held fixedly on the side rails 16*a*, 16*b*.

Figure 4:
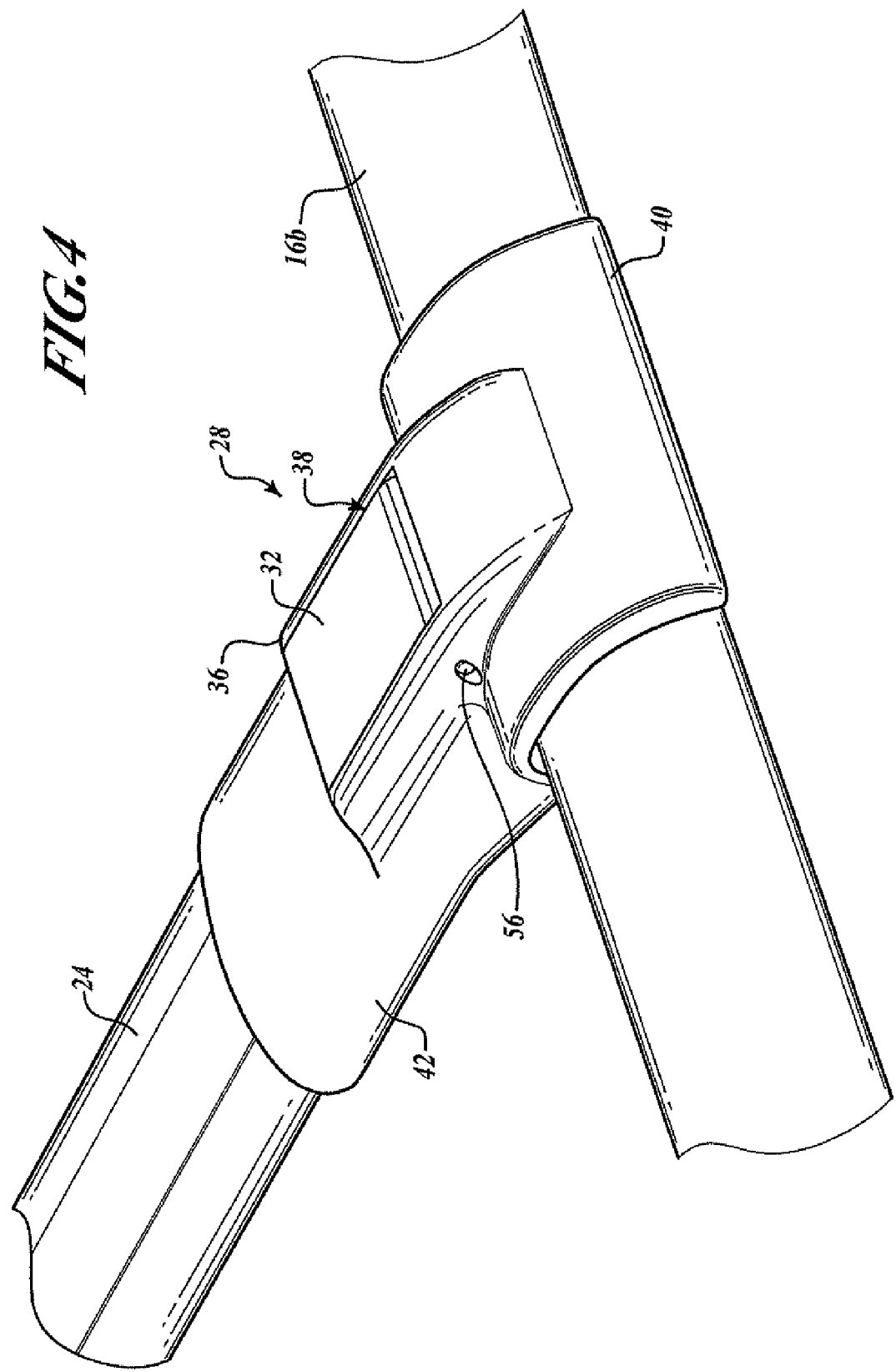
FIG. 4 is an enlarged perspective view of one of the end support assemblies of the cross bar of FIG. 2, which a user would manually grasp to unlock both of the locking members simultaneously.

FIG. 4 shows an enlarged perspective view of the end support assembly 28. The end support assembly 28 includes a housing 36 having an opening 38 within which the locking member 32 sits, A clamping portion 40 lies over the side rail 16*b*. A tubular neck portion 42 receives an end of the cross bar 24 and is secured thereto by suitable threaded fasteners (not visible).

Figure 5:
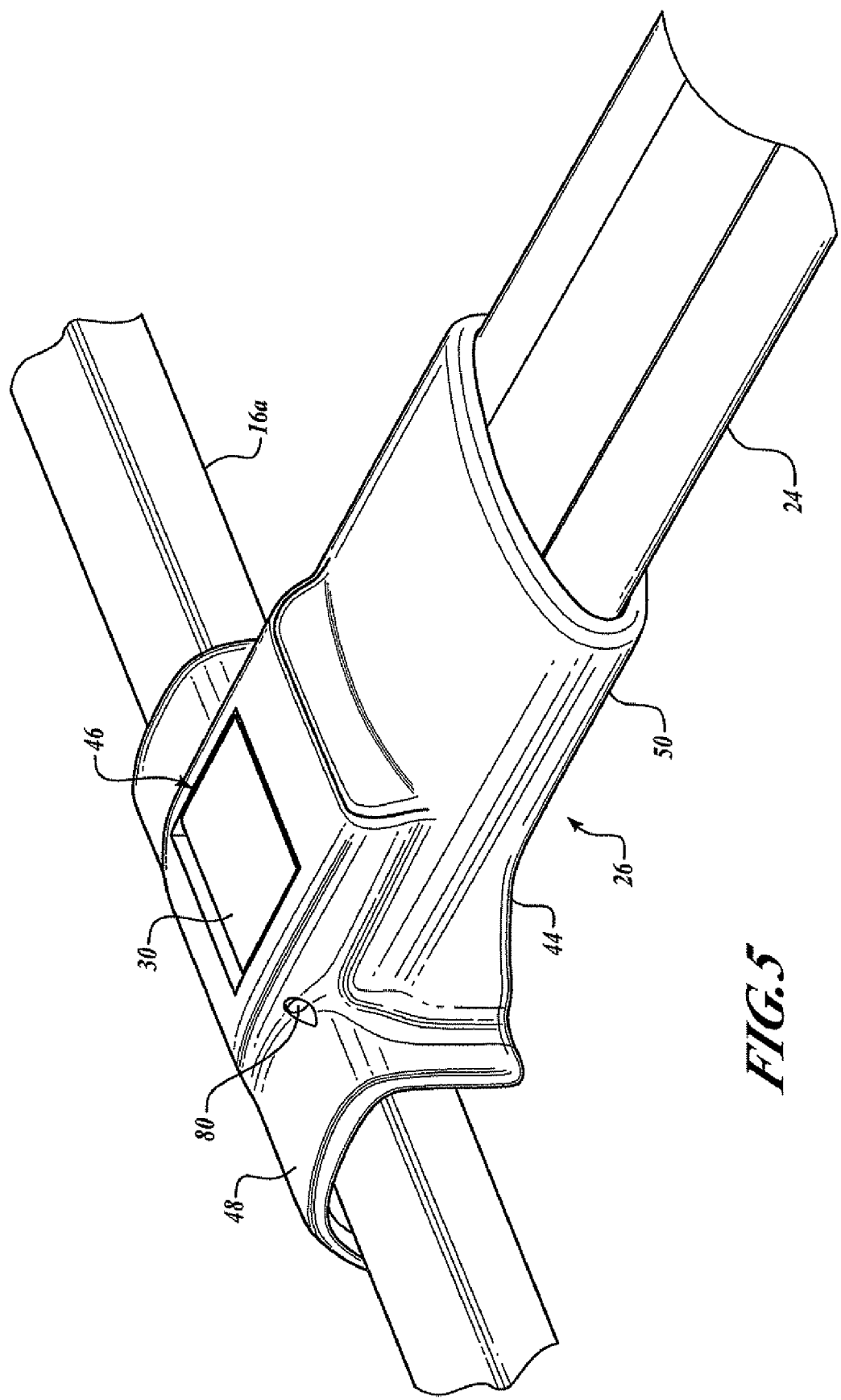
FIG. 5 is an enlarged perspective view of the end support at the opposite end of the cross bar to that shown in FIG. 4.

End support assembly 26 is shown in enlarged fashion in FIG. 5. Assembly 26 includes a housing 44 having an opening 46 within which the locking member 30 resides. A clamping portion 48 rests over side rail 16*a*. A tubular neck portion 50 receives an end of the cross bar 24 and is secured to the end of the cross bar 24 via threaded fasteners (not shown).

Figure 6:
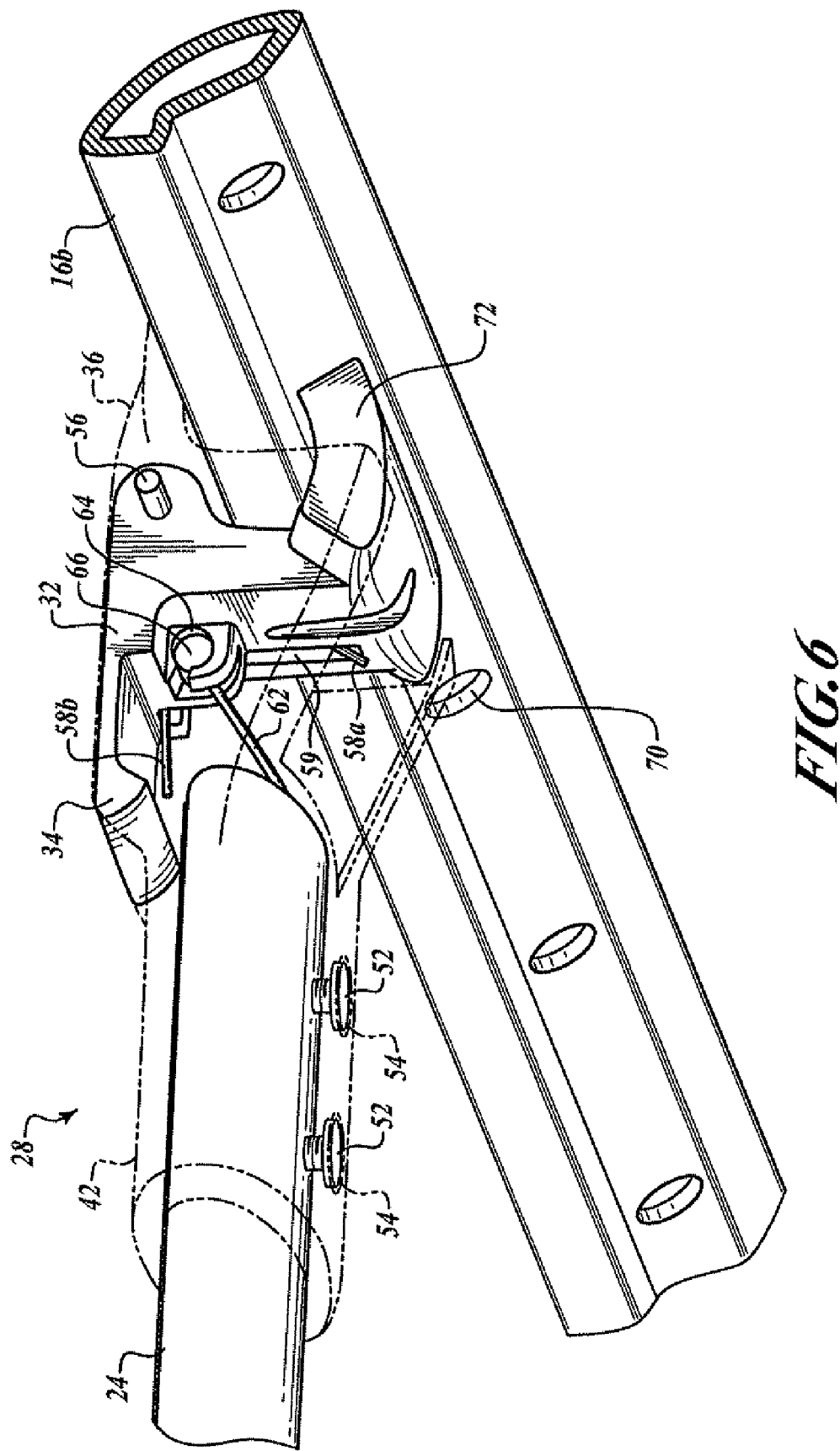
FIG. 6 is a perspective view of the end support that includes the user actuable locking member showing the internal components of the end support assembly.

FIG. 6 illustrates the internal structure of the end support assembly 28. Tubular neck portion 42 is secured to the end of the cross bar 24 by threaded fasteners 52 extending through openings 54 in the neck portion 42. The locking member 32 is pivotally supported via a pivot pin 56. The pivot pin 56 is supported at its ends within recesses in the housing 36 such that the locking member 32 can be freely pivoted between locked and unlocked positions. The locking member 32 is biased into its locked position, as shown in FIG. 6, by a spring 58. With additional reference to FIG. 8, the spring 58 includes a first end 58*a* positioned in a slot 59 that abuts a wall portion 60 of the slot 59. Portion 58*b* of the spring 58 abuts an internal wall of the housing 36 such that the locking member 32 is continuously biased into the locked position shown in FIG. 6.

Figure 8:
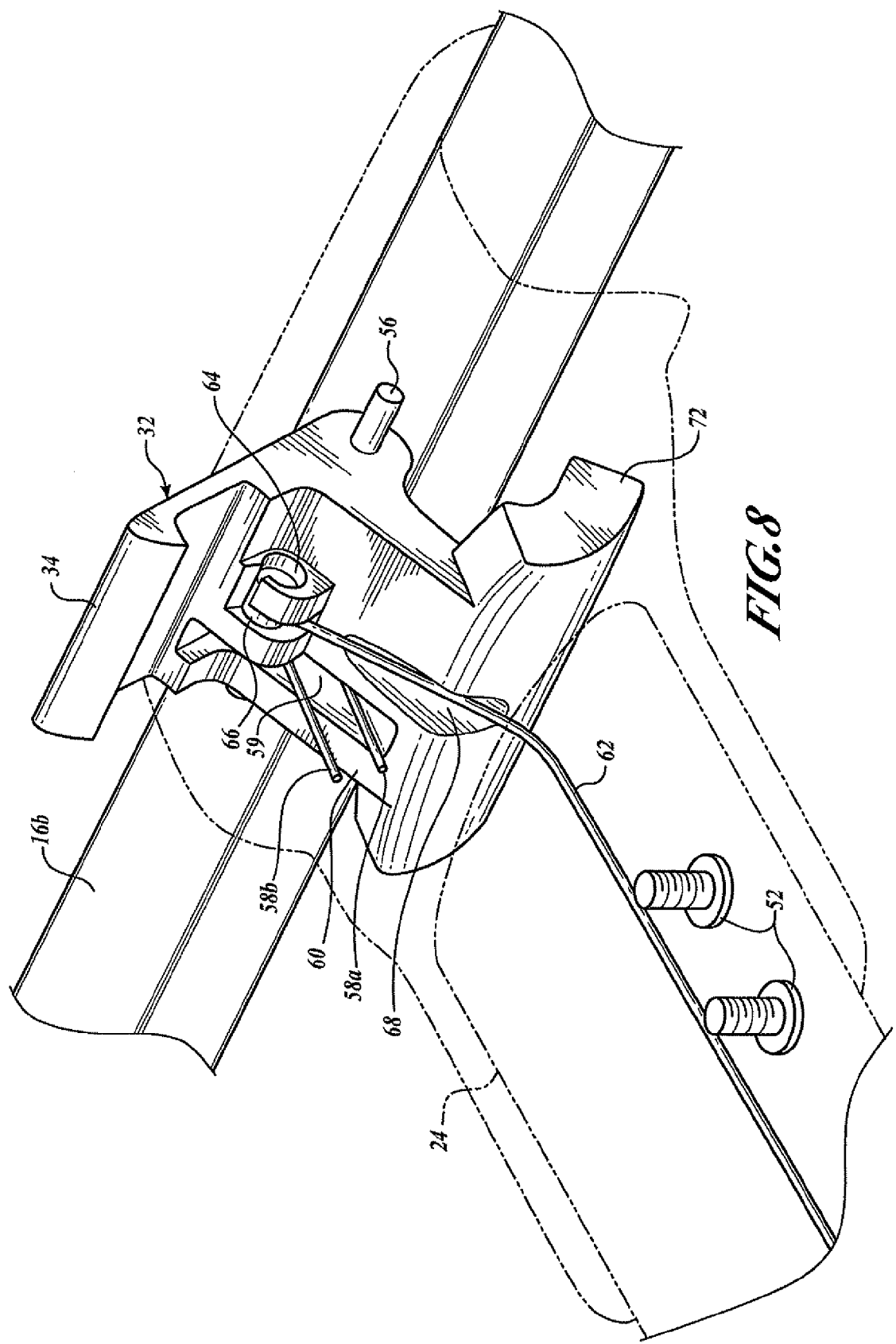
FIG. 8 is an enlarged perspective view of the locking member that is manually actuatable by the user.

With further reference to FIGS. 6 and 8, a cable 62 is secured within a pocket 64 of the locking member 32. The cable 62 includes an enlarged head portion 66 that fits within the pocket 64. The cable extends through a groove 68 formed in the locking member 32 and through the interior area of the tubular cross bar 24.

Figure 10:
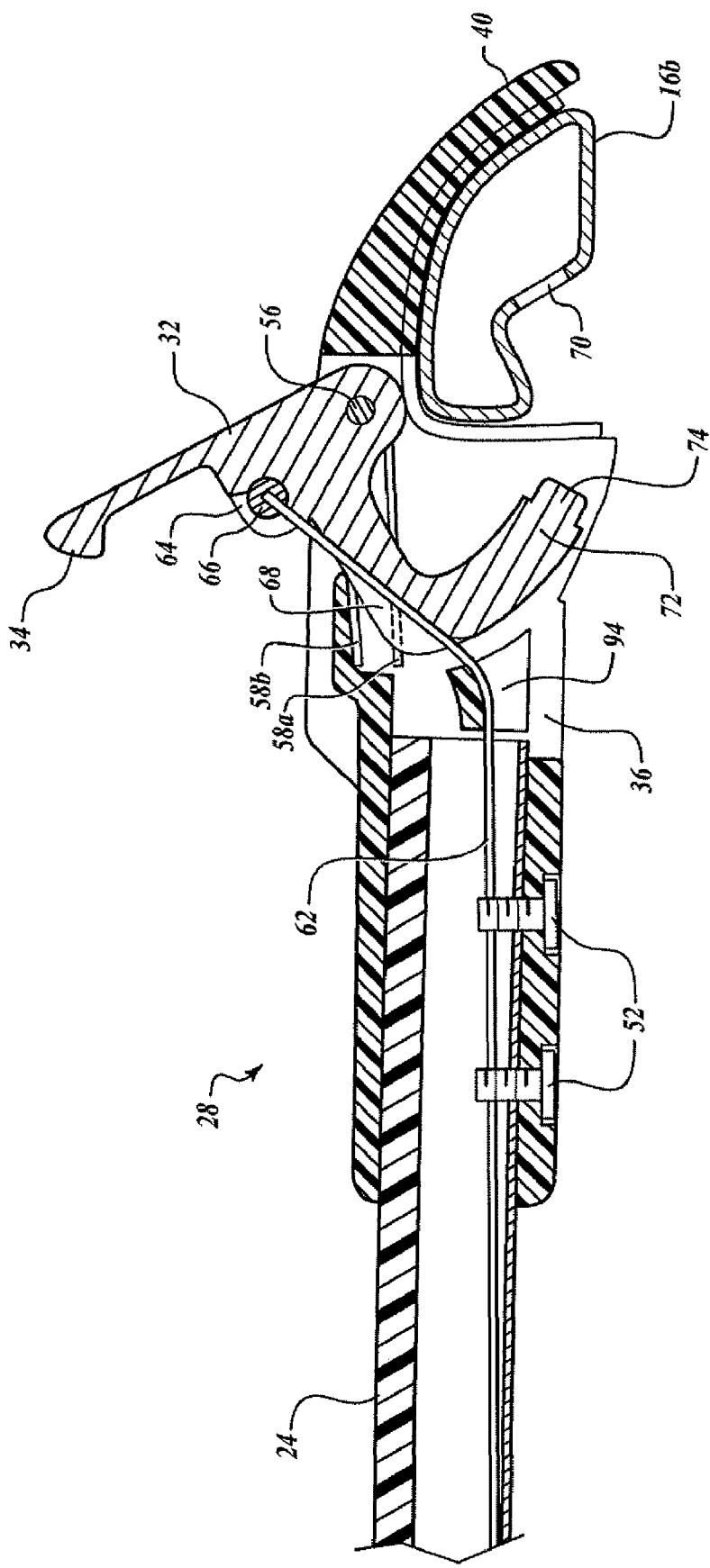
FIGS. 10 and 11 are enlarged side views of the user actuatable locking member in its unlocked and locked positions, respectively.
Figure 11:
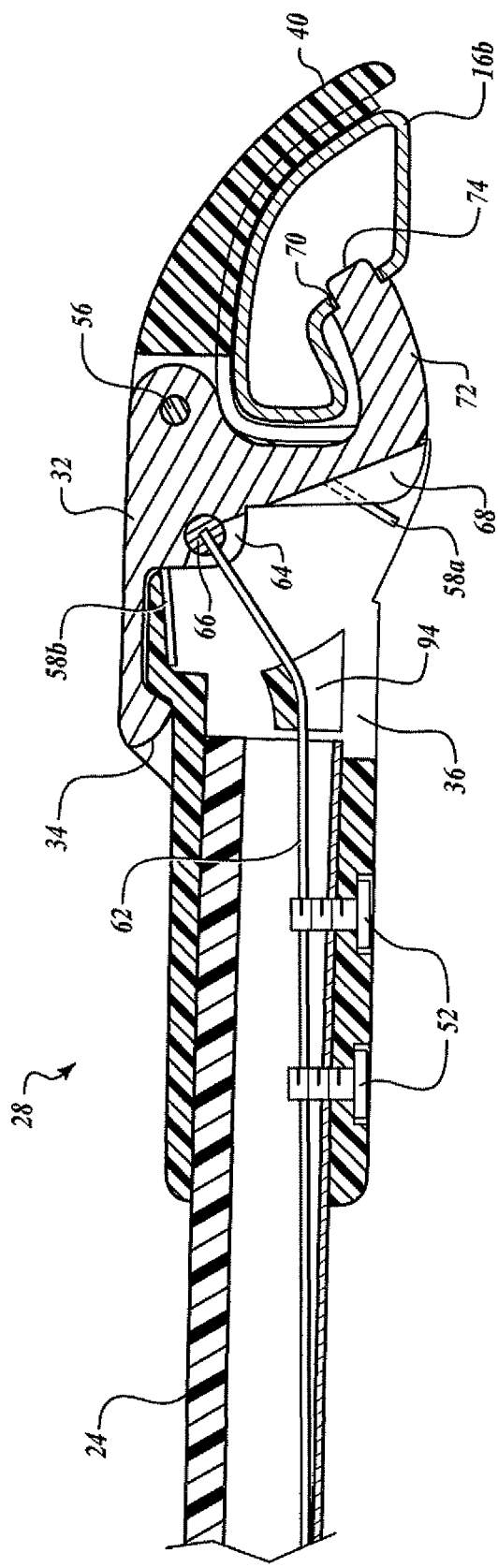

With specific reference to FIG. 6, side rail 16*b* can also be seen to include a plurality of openings 70. With reference to FIGS. 6, 10 and 11, the locking member 32 can be seen to include a jaw portion 72 having a head portion 74. Head portion 74 projects through one of the openings 70 when the jaw portion 72 is aligned with the selected opening 70 to allow the end support assembly 28 to be fixedly secured to the side rail 16*b* at a desired longitudinal position.

Figure 9:
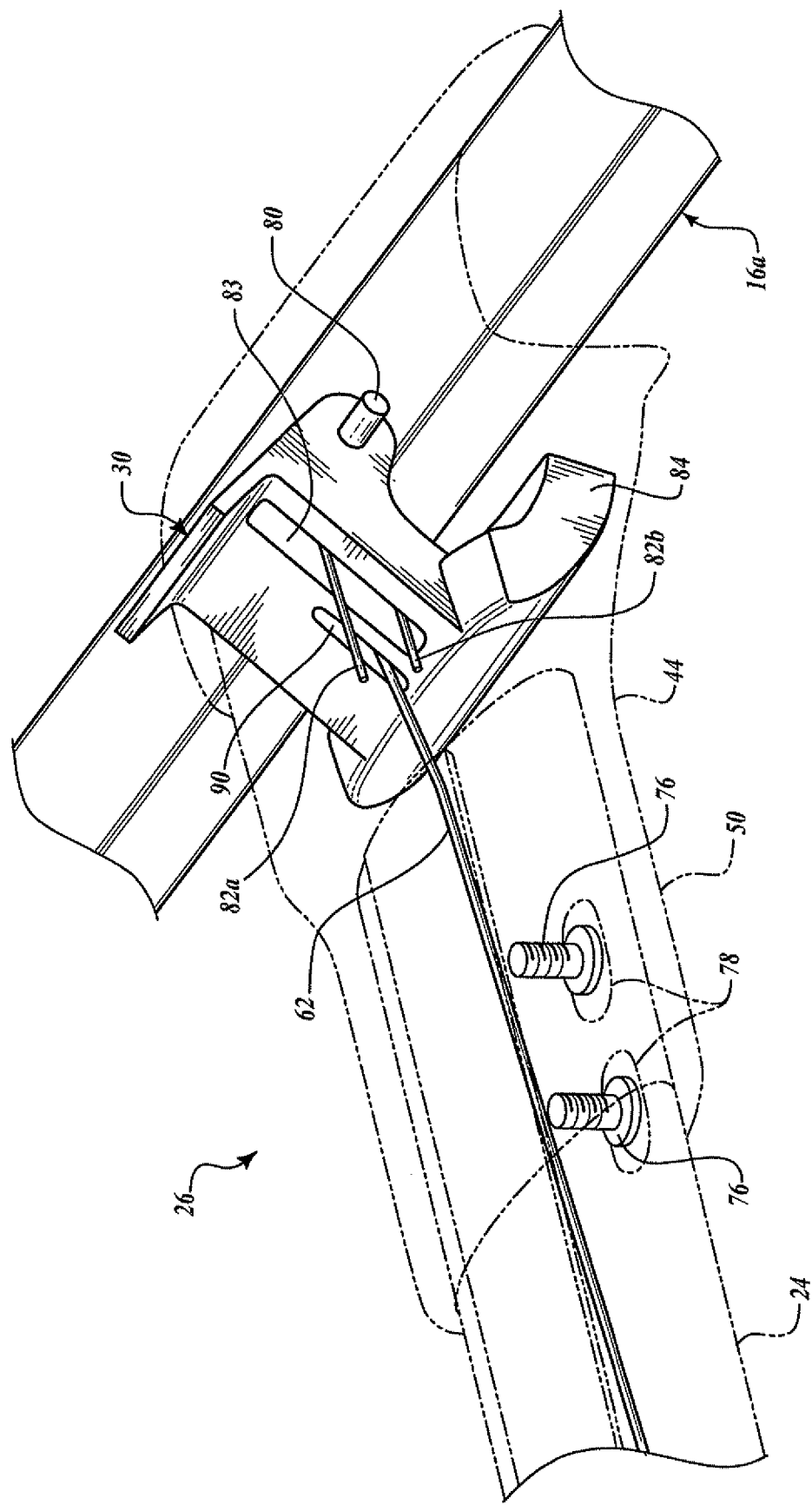
FIG. 9 is an enlarged perspective view of the non-user actuatable locking member.
Figure 12:
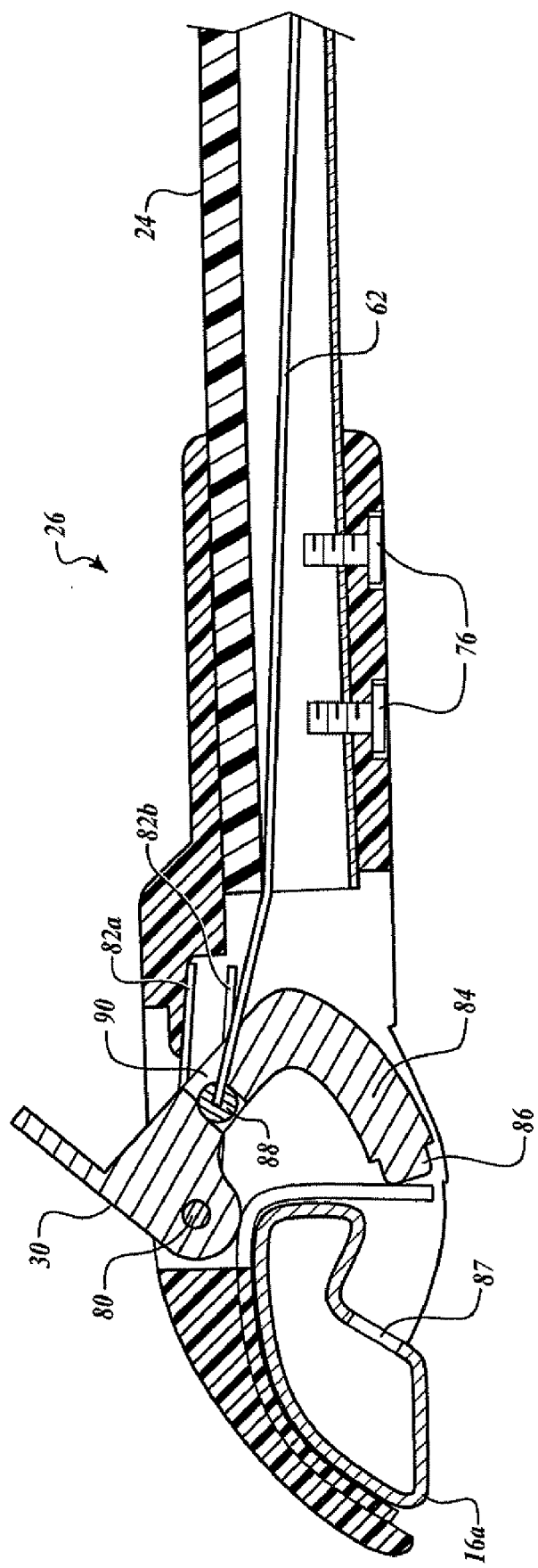
FIG. 12 is a side view of the non-manually engageable locking member in its unlocked position.
Figure 13:
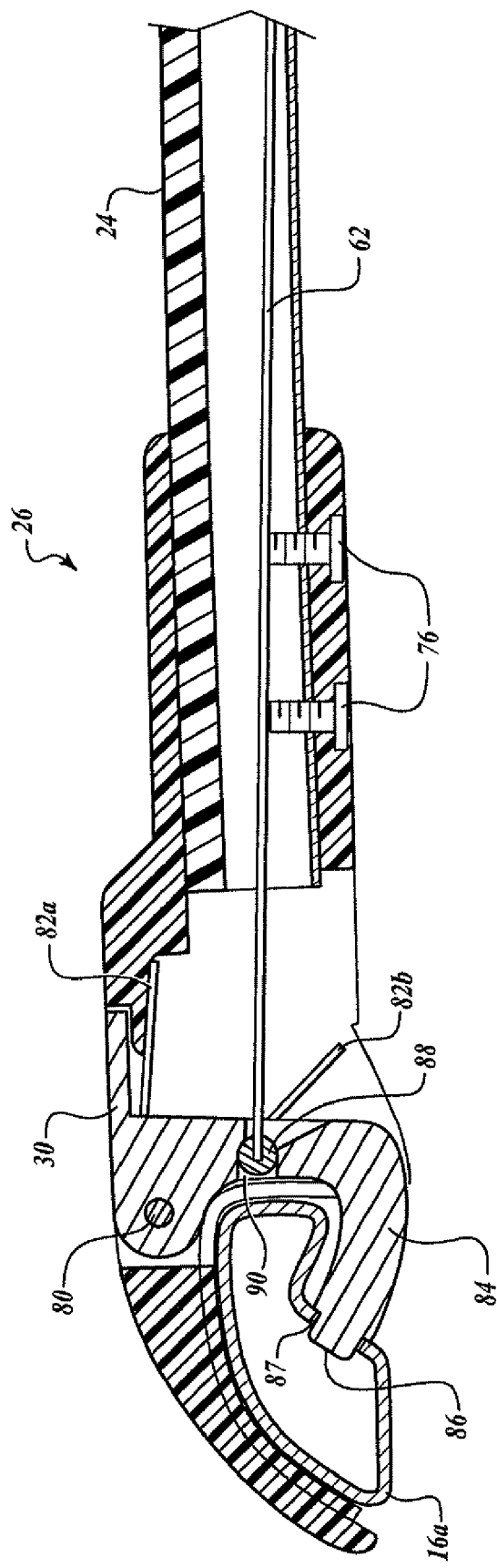
FIG. 13 is a side view of the end support of FIG. 12 but showing the non-manually engageable locking member in its locked position.

Referring to FIGS. 9, 12 and 13, the locking member 30 is shown in greater detail. The tubular neck portion 50 is secured via threaded fasteners 76 that extend through openings 78 in the neck portion 50 to secure the neck portion 50 to an end of the cross bar 24. The locking member 30 is mounted within the housing 44 of the end support assembly 26 for pivotal movement via pivot pin 80. Pivot pin 80 is positioned within recesses (not visible) in the housing 44 such that the locking member 30 is free to pivot between the positions shown in FIGS. 12 and 13. A biasing spring 82 having leg portions 82*a* and 82*b* is positioned within a pocket 90 (FIGS. 7, 9, 12 and 13) and biases the locking member 30 into the locked position, as shown in FIG. 13. The locking member 32 includes a lower jaw 84 having a head portion 86, as shown in FIGS. 12 and 13, for engaging with one of openings 87, of its associated side rail 16*a*. In this regard, it will be appreciated that side rail 16*a* is preferably of identical construction to side rail 16*b*, and includes a plurality of spaced apart openings, such as openings 70 for side rail 16*b* in FIG. 6, to enable adjustable positioning of the end support assembly 26 at specific, desired positions along its side rail 16*a*.

Figure 7:
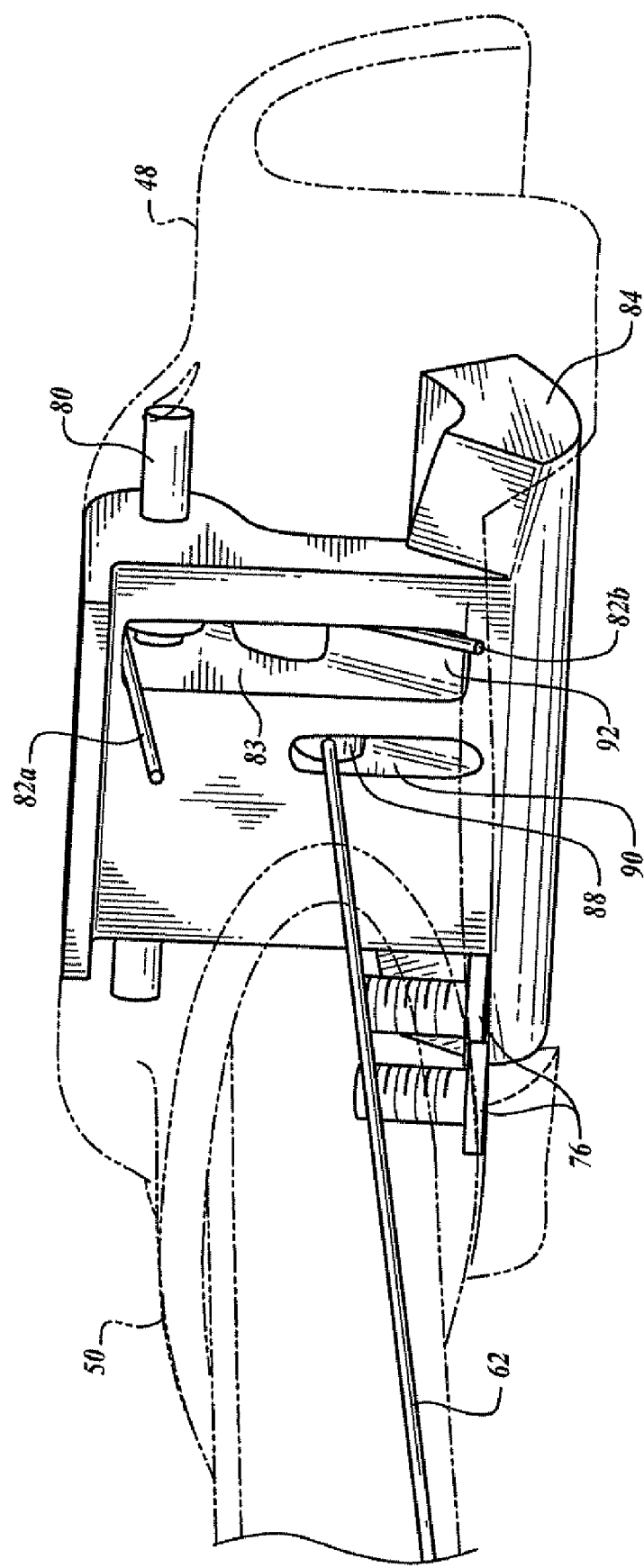
FIG. 7 is a perspective view of the end support assembly that is not user actuatable, illustrating the internal components of the end support assembly.

With further reference to FIGS. 7 and 9, the end of the cable 62 opposite to head portion 66 includes an enlarged head portion 88 which is captured in a pocket 90 in the locking member. The cable 62 is preferably a steel cable coated with a layer of nylon, but any material having suitable strength could be employed. The spring 82 biases the locking member 30 into the closed position, as shown in FIG. 13, by having leg portion 82*b* abut a wall portion 92 (FIG. 7) of the locking member 30, while leg 82*a* portion abuts an interior wall portion of the housing 44.

To help guide the cable 62 for smooth movement through the cross bar 24 and the end support assemblies 26 and 28, a channel 94 is formed in the housing 36, as shown in FIGS. 10 and 11.

Referring to FIGS. 14 and 15, when the user needs to remove the cross bar 24 from the side rails 16*a*, 16*b* or to reposition the cross bar 24 along the side rails, the user grasps and lifts the lip portion 34 of locking member 32 and moves the locking member 32 rotationally (clockwise in FIGS. 14 and 15) from the position shown in FIG. 15 to the position shown in FIG. 14. This moves the head portion 74 of the jaw 72 out of engagement with one of the openings 70 in the side rail 16*b*. This rotational movement also draws the cable 62 to the right in the drawing of FIG. 14, which simultaneously causes pivoting movement of locking member 30 from its locked position (FIG. 15) to its unlocked position (FIG. 14). In the unlocked position of FIG. 14, the jaws 84 and 72 of the locking members 30 and 32, respectively, clear their respective side rails 16a, 16b and enable the entire cross bar 24, together with end supports 26 and 28 to be lifted directly off the side rails 16a, 16b. When the user releases the locking member 32, the biasing force provided by springs 58 and 82 simultaneously return the locking members 30 and 32 to the positions shown in FIG. 15. Accordingly, locking and unlocking of both of the end support assemblies 26 and 28 can be accomplished simply by moving the locking member 32 between its locked and unlocked positions. The user then is not required to first unlock one end of the cross bar 24, and then walk around to the opposite side of the vehicle to separately unlock the opposite end of the cross bar.

The system 10 accomplishes simultaneous locking and unlocking of the end support assemblies 26 and 28 with a minimum number of independent component parts. Importantly, the cross bar 24 can be removed from its associated side rails 16a, 16b without any disassembly of the side rails. The cross bar 24 can also be positively secured at various predetermined locations along the side rails 16a, 16b by engagement within selected ones of the spaced apart openings 70 along each of the side rails 16a, 16b.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A vehicle article carrier system comprising:
   first and second support rails adapted to be secured adjacent a vehicle outer body surface generally parallel to one another;
   a tubular cross bar having first and second end support assemblies at opposite ends thereof;
   said first end support assembly having a housing with a first pivotally mounted locking member supported therein, said first pivotally mounted locking member being adapted to engage with said first support rail;
   said second end support assembly having a housing with a second pivotally mounted locking member supported therein, said second pivotally mounted locking member being adapted to engage with said second support rail;
   a cable coupled at a first end thereof to a portion of said first pivotally mounted locking member, and at a second end thereof to said second pivotally mounted locking member, and extending through said cross bar;
   said first end of said cable further being coupled to said first pivotally mounted locking member at a point thereon that enables said cable to be pulled through said cross bar as said first pivotally mounted locking member is moved from a locked position to an unlocked position, to thus simultaneously urge said second pivotally mounted locking member from a locked position to an unlocked position, said cable further being coupled to said second pivotally mounted locking member at a location on said second pivotally mounted locking member that causes simultaneous rotational movement of said second pivotally mounted locking member in a rotational direction opposite to that of said first pivotally mounted locking member; and
   wherein each of said first and second pivotally mounted locking members includes:
   a jaw portion that moves rotationally within a plane parallel to said cross bar to engage with its said respective support rail;
   a cable receiving portion integrally formed with each said locking member that enables an associated one of said first and second ends of said cable to be secured directly thereto without external fastening components; and
   wherein said first pivotally mounted locking member includes a groove formed in a surface thereof that receives the cable when said first pivotally mounted locking member is in the unlocked position, wherein the cable is not located in the groove when said first pivotally mounted locking member is in the locked position.

2. The system of claim 1, wherein each of said end support assemblies includes a biasing element for biasing its respective said pivotally mounted locking member into a closed position.

3. The system of claim 2, wherein each said biasing element comprises a coil spring having a pair of outwardly extending leg portions, with one of said leg portions engaging a portion of its respective said pivotally mounted locking member and the other of said leg portions engaging a respective one of said housings.

4. The system of 1, wherein said first pivotally mounted locking member includes a lip adapted to be grasped by a user to enable the user to manipulate said first pivotally mounted locking member between open and closed positions.

5. The system of claim 1, wherein each said jaw portion is integrally formed with its respective said pivotally mounted locking member, and wherein said first pivotally mounted locking member further comprises an integrally formed lip adapted to be grasped by at least one finger of a user to manipulate said first pivotally mounted locking member between said locked and unlocked positions.

6. A single sided release vehicle article carrier system comprising:
   first and second support rails adapted to be secured adjacent a vehicle outer body surface generally parallel to one another, each of said support rails including a channel having a plurality of spaced apart openings thereal ong;
   a tubular cross bar having first and second end support assemblies at opposite ends thereof;
   said first end support assembly being engaged with said first support rail and adapted to move slidably therealong, said first end support assembly having a housing with a first pivotally mounted locking member supported therein, said first pivotally mounted locking member being adapted to engage with a selected one of said openings in said first support rail to thus lock said first end support assembly at a selected longitudinal position along said first support rail;
   said second end support assembly being engaged with said second support rail and adapted to move slidably therealong, said second end support assembly having a housing with a second pivotally mounted locking member supported therein, said second pivotally mounted locking member being adapted to engage with a selected one of said openings in said second support rail to thus lock said second end support assembly at said selected longitudinal position, and such that said cross bar is held elevationally above said outer body surface by said first and second end support assemblies;
   each of said first and second pivotally mounted locking members including integrally formed structure thereon for capturing an end portion of a cable;
   a cable coupled at a first end thereof to the integrally formed structure of said first pivotally mounted locking member, and at a second end thereof to said integrally formed structure of said second pivotally mounted locking member, and the cable extending through said cross bar;

said first end of said cable further being coupled to said first pivotally mounted locking member at a point thereon that enables said cable to be pulled through said cross bar as said first pivotally mounted locking member is moved from a locked position to an unlocked position, to thus simultaneously urge said second pivotally mounted locking member from a locked position to an unlocked position, said cable further being coupled to said second pivotally mounted locking member at a location on said second pivotally mounted locking member that causes simultaneous rotational movement of said second pivotally mounted locking member in a rotational direction opposite to that of said first pivotally mounted locking member;

a biasing element operably associated with at least one of said first and second pivotally mounted locking members for simultaneously biasing said first and second pivotally mounted locking members towards said locked positions;

wherein each of the pivotally mounted locking members includes an integrally formed jaw portion that moves rotationally along an axis parallel to said tubular cross bar, to engage its respective said support rail; and wherein said first pivotally mounted locking member includes a groove formed in a surface thereof that receives the cable when said first pivotally mounted locking member is in the unlocked position, wherein the cable is not located in the groove when said first pivotally mounted locking member is in the locked position.

7. The system of claim 6, wherein the first pivotally mounted locking member includes a lip for enabling a user to manually manipulate said first pivotally mounted locking member between said locked and unlocked positions.

8. The system of claim 6, wherein:
said first end support assembly includes a pivot pin for pivotally supporting said first pivotally mounted locking member;
said biasing element is disposed on said pivot pin; and
said biasing element includes a pair of leg portions, with a first one of said leg portions abutting a surface portion of said first pivotally mounted locking member and a second one of said leg portions abutting an interior surface of said housing of said first end support assembly.

9. The system of claim 6, wherein said first end support assembly is configured to rest on said first support rail.

10. The system of claim 9, wherein said housing of said first end support assembly includes a clamping portion adapted to rest over an upper surface of said first support rail when said first end support assembly is secured to said first support rail.

11. A single sided release vehicle article carrier system comprising:
first and second support rails adapted to be secured adjacent a vehicle outer body surface generally parallel to one another, each of said support rails including a channel having a plurality of spaced apart openings therealong;
a tubular cross bar having first and second end support assemblies at opposite ends thereof;
said first end support assembly being engaged with said first support rail and adapted to move slidably therealong, said first end support assembly having a housing with a first pivotally mounted locking member supported therein and a clamping portion adapted to rest over a portion of said first support rail, said first pivotally mounted locking member being adapted to engage with a selected one of said openings in said first support rail to thus lock said first end support assembly at a selected longitudinal position along said first support rail;
said second end support assembly being engaged with said second support rail and adapted to move slidably therealong, said second end support assembly having a housing with a second pivotally mounted locking member supported therein and a clamping portion adapted to rest over a portion of said second support rail, said second pivotally mounted locking member being adapted to engage with a selected one of said openings in said second support rail to thus lock said second end support assembly at a selected longitudinal position on said second support rail, and such that said cross bar is held elevationally above said outer body surface by said first and second end support assemblies;
each of said pivotally mounted locking members including an integrally formed pocket portion;
a cable coupled at a first end thereof to said pocket portion of said first pivotally mounted locking member, and coupled at a second end thereof to said pocket portion of said second pivotally mounted locking member, and the cable extending through said cross bar;
the pocket portion of the first pivotally mounted locking member further being located at a position on the first pivotally mounted locking member that enables said cable to be pulled through said cross bar as said first pivotally mounted locking member is rotated from a locked position to an unlocked position, to thus simultaneously urge said second pivotally mounted locking member from a locked position to an unlocked position, wherein said first pivotally mounted locking member includes a groove formed in a surface thereof that receives the cable when said first pivotally mounted locking member is in the unlocked position, wherein the cable is not located in the groove when said first pivotally mounted locking member is in the locked position;
a biasing element operably associated with at least one of said first and second pivotally mounted locking members for simultaneously biasing said first and second pivotally mounted locking members towards said locked positions, and for automatically biasing both of said pivotally mounted locking members into their locked positions simultaneously when said first pivotally mounted locking member is disengaged by a user; and
wherein coupling of said cable to said pocket portion of said second pivotally mounted locking member is at a location on said second pivotally mounted locking member that causes simultaneous rotational movement of said second pivotally mounted locking member in a rotational direction opposite to that of said first pivotally mounted locking member.

12. The apparatus of claim 11, wherein said first pivotally mounted locking member includes a lip to enable a user to manually engage said first pivotally mounted locking member with one or more fingers of a hand.

13. The apparatus of claim 11, wherein said first pivotally mounted locking member includes:
a lip to enable a user to manually engage said first pivotally mounted locking member with one or more fingers of a hand;
a clamping portion that extends over an upper surface portion of said first support rail when said first pivotally mounted member is resting on said first support rail; and
a jaw portion having a head portion for engaging with an opening in said first support rail.

* * * * *